United States Patent
Rensburg et al.

(10) Patent No.: US 9,961,193 B2
(45) Date of Patent: May 1, 2018

(54) ENHANCED CALLER-ID INFORMATION SELECTION AND DELIVERY

(71) Applicant: RingCentral, Inc., Belmont, CA (US)

(72) Inventors: Christopher Van Rensburg, Foster City, CA (US); Patrice Khawam, San Francisco, CA (US)

(73) Assignee: RingCentral, Inc., Belmont, CA (US)

( * ) Notice: Subject to any disclaimer, the term of this patent is extended or adjusted under 35 U.S.C. 154(b) by 0 days. days.

(21) Appl. No.: 15/267,989

(22) Filed: Sep. 16, 2016

(65) Prior Publication Data

US 2017/0041462 A1 Feb. 9, 2017

Related U.S. Application Data

(63) Continuation of application No. 14/924,083, filed on Oct. 27, 2015, now Pat. No. 9,456,078, which is a continuation of application No. 14/448,469, filed on Jul. 31, 2014, now Pat. No. 9,203,954.

(51) Int. Cl.
| | |
|---|---|
| *H04M 15/00* | (2006.01) |
| *H04M 3/42* | (2006.01) |
| *H04W 4/16* | (2009.01) |

(52) U.S. Cl.
CPC ... *H04M 3/42059* (2013.01); *H04M 3/42042* (2013.01); *H04M 3/42068* (2013.01); *H04M 3/42348* (2013.01); *H04W 4/16* (2013.01); *H04M 2242/15* (2013.01)

(58) Field of Classification Search
CPC .............. H04L 29/06; H04L 29/06027; H04L 29/12094; H04L 61/1529; H04L 65/1069; H04M 2201/18; H04M 2203/105; H04M 2203/2072; H04M 2203/6009; H04M 3/42008; H04M 3/42059; H04M 3/42042; H04M 3/23448; H04W 4/16
USPC ............ 379/142.01, 142.04, 142.09, 142.11, 379/142.17, 207.15, 245, 247; 370/356
See application file for complete search history.

(56) References Cited

U.S. PATENT DOCUMENTS

| | | |
|---|---|---|
| 5,274,699 A | 12/1993 | Ranz |
| 5,864,612 A | 1/1999 | Strauss et al. |
| 5,901,209 A | 5/1999 | Tannenbaum et al. |
| 6,324,271 B1 | 11/2001 | Sawyer et al. |
| 6,400,808 B1 | 6/2002 | Burg |
| 6,771,755 B1 | 8/2004 | Simpson |
| 7,280,647 B2 | 10/2007 | Henderson |
| 7,656,878 B2 | 2/2010 | Caballero-McCann et al. |
| 7,945,253 B2 | 5/2011 | Zellner |
| 7,995,727 B1 | 8/2011 | Chmara et al. |
| 8,331,916 B2 | 12/2012 | Martin et al. |
| 8,488,760 B2 | 7/2013 | Abramson et al. |
| 8,503,658 B2 | 8/2013 | Chatterjee et al. |
| 8,515,037 B2 | 8/2013 | Ye |

(Continued)

*Primary Examiner* — Binh Kien Tieu
(74) *Attorney, Agent, or Firm* — Finnegan, Henderson, Farabow, Garrett & Dunner LLP

(57) ABSTRACT

Technologies relating to enhanced Caller ID information selection for a caller associated with a call and delivery of the selected enhanced Caller ID information to a callee associated with the call include one or more processors selecting, according to selection criteria, one or more enhanced Caller ID information items from a collection of available enhanced Caller ID information items pertaining to the caller that are stored across one or more databases of enhanced Caller ID information.

17 Claims, 6 Drawing Sheets

(56) References Cited

U.S. PATENT DOCUMENTS

| | | |
|---|---|---|
| 8,515,038 B2 | 8/2013 | Chmara et al. |
| 8,537,994 B2 | 9/2013 | Hillier |
| 8,553,864 B2 | 10/2013 | Chatterjee |
| 8,577,000 B1 | 11/2013 | Brown |
| 8,588,385 B2 | 11/2013 | Kuhlke et al. |
| 8,681,958 B2 | 3/2014 | Chatterjee |
| 8,730,974 B2 | 5/2014 | Karaoguz et al. |
| 8,744,053 B2 | 6/2014 | Denny et al. |
| 8,831,191 B1 | 9/2014 | Vendrow |
| 8,831,578 B2 | 9/2014 | Bonner |
| 9,332,119 B1* | 5/2016 | Danis ............... H04M 3/42042 |
| 2002/0118807 A1 | 8/2002 | Pedersen |
| 2003/0112948 A1* | 6/2003 | Brown ............... H04M 3/42008 |
| | | 379/207.04 |
| 2005/0100150 A1* | 5/2005 | Dhara .................. H04L 29/06 |
| | | 379/142.01 |
| 2005/0144249 A1* | 6/2005 | Alex ................ H04M 3/42136 |
| | | 709/212 |
| 2005/0163298 A1 | 7/2005 | Creamer et al. |
| 2006/0039545 A1 | 2/2006 | Rahman et al. |
| 2007/0268896 A1* | 11/2007 | Oyama ............ H04L 29/06027 |
| | | 370/389 |
| 2008/0152097 A1 | 6/2008 | Kent |
| 2009/0161845 A1 | 6/2009 | Adams et al. |
| 2009/0203361 A1 | 8/2009 | Huang et al. |
| 2009/0209241 A1 | 8/2009 | Karaoguz et al. |
| 2009/0323912 A1 | 12/2009 | Toner et al. |
| 2010/0061531 A1 | 3/2010 | Lund |
| 2010/0246784 A1* | 9/2010 | Frazier ............... H04L 65/1083 |
| | | 379/88.13 |
| 2010/0278319 A1* | 11/2010 | Wang ................... H04L 51/36 |
| | | 379/88.11 |
| 2011/0286584 A1* | 11/2011 | Angel .................... G10L 15/26 |
| | | 379/88.02 |
| 2013/0051542 A1 | 2/2013 | Yao et al. |
| 2014/0003594 A1 | 1/2014 | Chatterjee |
| 2014/0337316 A1* | 11/2014 | Abuelsaad ........ G06F 17/30867 |
| | | 707/722 |
| 2014/0348312 A1 | 11/2014 | Martino et al. |
| 2015/0003599 A1* | 1/2015 | Brunn ............... G06F 17/30864 |
| | | 379/142.04 |
| 2015/0055768 A1 | 2/2015 | White et al. |
| 2015/0163353 A1* | 6/2015 | Nezarati ........... H04M 3/42042 |
| | | 379/142.04 |
| 2016/0156757 A1* | 6/2016 | Kotab .................... H04M 1/57 |
| | | 455/415 |
| 2016/0163317 A1* | 6/2016 | Zetterberg ........ H04M 3/42382 |
| | | 379/88.14 |
| 2016/0241692 A1* | 8/2016 | Wosk ............. H04M 1/274516 |

* cited by examiner

400

Selecting one or more of the identified enhanced caller id information items for delivery to an electronic communications device of a callee associated with the call. 402

> Selecting enhanced caller id information items from among the set of identified enhanced caller id information items pertaining to the caller that have a relevance ranking better than or equal to a predetermined ranking threshold. 404

> Selecting enhanced caller id information items from among the set of identified enhanced caller id information items pertaining to the both the caller and the callee. 406

> Selecting enhanced caller id information items from among the set of identified enhanced caller id information items pertaining to the caller that have not yet been delivered to the callee, or have been delivered to the callee less than or equal to a threshold number of times. 408

> Selecting enhanced caller id information items from among the set of identified enhanced caller id information items pertaining to the caller that are associated with an event. 410

> Selecting enhanced caller id information items from among the set of identified enhanced caller id information items pertaining to the caller relating to a geo-location of the originating electronic communications device. 412

> Selecting enhanced caller id information items from among the set of identified enhanced caller id information items pertaining to the caller relating to a current time of the call. 414

Delivering one or more selected enhanced caller id information items to an endpoint electronic communications device of a callee. 502

Sending the selected enhanced caller id information items in one or more IP-based data packets toward the callee's electronic communications device. 504

FIG. 5

ENHANCED CALLER-ID INFORMATION SELECTION AND DELIVERY

CROSS REFERENCE TO RELATED APPLICATIONS

This application is a continuation of and claims priority from U.S. patent application Ser. No. 14/924,083, filed Oct. 27, 2015 (U.S. Pat. No. 9,456,078), which is a continuation of U.S. patent application Ser. No. 14/448,469, filed Jul. 31, 2014 (U.S. Pat. No. 9,203,954), all of which are incorporated herein by reference.

FIELD OF THE INVENTION

This specification relates to enhanced caller identification (Caller ID) selection and delivery for a call, for example, by selecting one or more enhanced Caller ID information items from a plurality of enhanced Caller ID information items pertaining to a caller associated with the call and delivering the selected enhanced Caller ID information items to an endpoint electronic communications device of a callee associated with the call.

BACKGROUND

Under some circumstances, contact information or an image of a caller (for example a caller calling a telephone call or a caller establishing a video conference call) can be associated with an address book entry for the caller. Moreover, the address book may be associated with a callee's electronic communications device (such as a mobile communications device, personal computer, or the like). The device sometimes presents the contact information or the image of the caller when a phone call from the caller is being received by the callee's device.

BRIEF DESCRIPTION OF THE DRAWINGS

FIG. 4 shows an example of a method for selecting one or more of a set of identified enhanced Caller ID information items pertaining to a caller prior to delivering the selected items to an electronic communications device of a callee.

FIG. 5 shows an example of a method for delivering one or more selected enhanced Caller ID information items to an endpoint electronic communications device of a callee.

DETAILED DESCRIPTION

Figure 1:
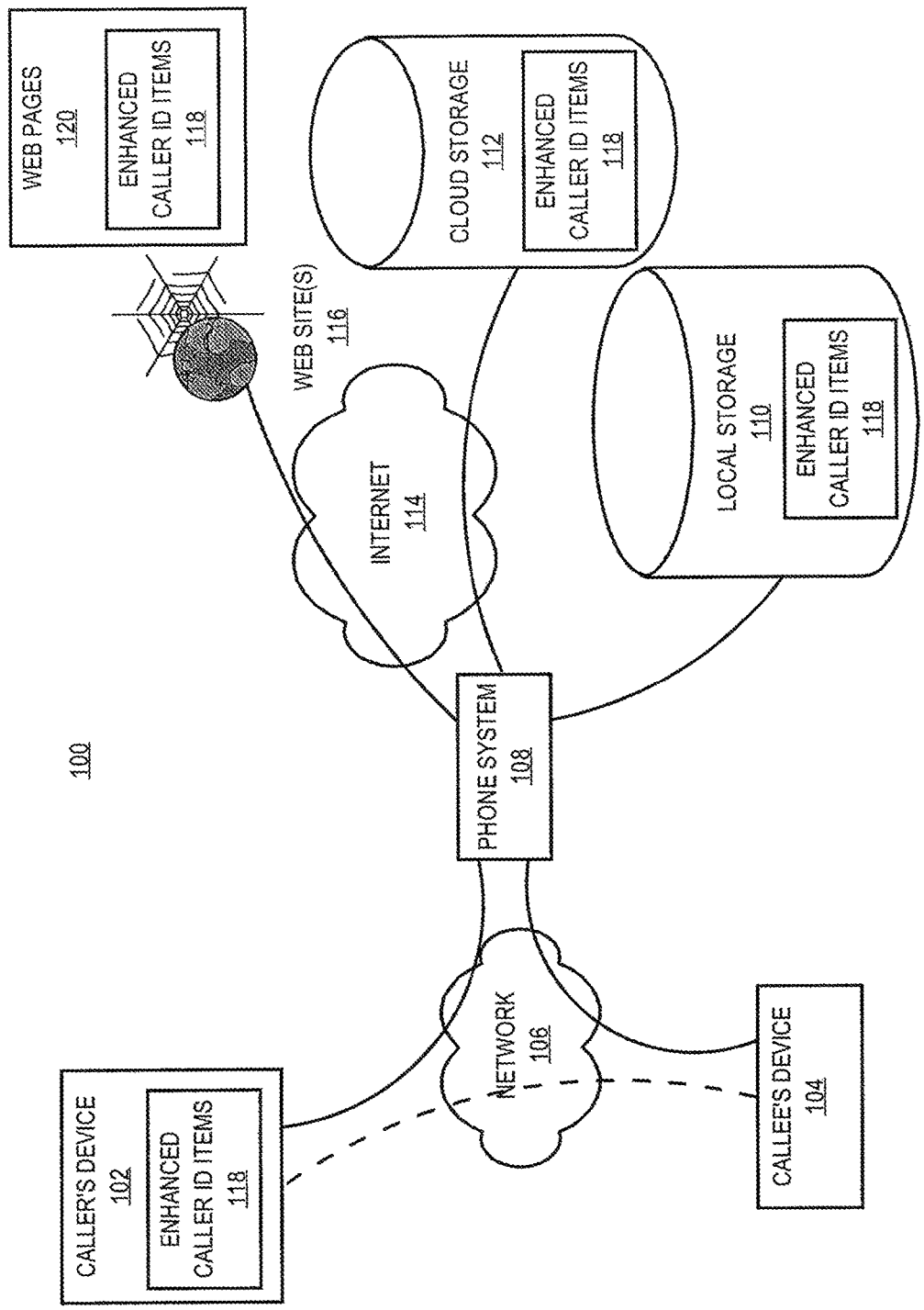
FIG. 1 is a block diagram of an example system for selecting one or more enhanced Caller ID information items for a caller associated with a call and delivering the selected enhanced Caller ID information to a callee associated with the call.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

This specification describes technologies relating to enhanced Caller ID information selection for a caller associated with a call and delivery of the selected enhanced Caller ID information to a callee associated with the call. More specifically, the described technologies relate to selecting, according to selection criteria, one or more enhanced Caller ID information items from a collection of available enhanced Caller ID information items that are stored across one or more databases of enhanced Caller ID information.

In one aspect, selection of enhanced Caller ID information items is based on the context, purpose, nature, or subject of the call and takes into account a relationship between the caller and the callee. For example, if a caller with a medical emergency calls a doctor or a public emergency number, enhanced Caller ID information items pertaining to the caller's medical condition or history may be selected and delivered to the callee's communications device based an established trust relationship between the caller and the callee.

In one aspect, enhanced Caller ID information about the caller belongs to one of the following three categories and selection of enhanced Caller ID information to deliver to the callee is based on its categorization as: 1) publicly available information about the caller, 2) information about the caller contributed by the callee, or 3) private information about the caller that the caller has given permission to be shared with the callee. Thus, selection of enhanced Caller ID information about the caller delivered to the callee can be based on, for example, one or more attributes of the caller or the callee, such as an identity of the caller, an identity of the callee; or a known relationship between the caller and the callee, prior correspondence between the caller and the callee, and/or the context or subject of the call, which can be inferred from the identity of the caller, the identity of the callee, the known relationship between the caller and the callee, prior correspondence between the caller and the callee, and/or the analysis of the content of the call or previous calls between the caller and the callee.

Advantageously, by providing selected enhanced Caller ID information about the caller to the callee, the caller and the caller's communication experience is improved because the callee is provided with more information about the caller that helps the callee better understand the context of the call.

Details of one or more implementations of the subject matter described in this specification are set forth in the accompanying drawings and the description below. Other features, aspects, advantages of the subject matter will become apparent from the description, the drawings, and the claims.

Example System

FIG. 1 is a block diagram of example system 100 for selecting one or more enhanced Caller ID information items 118 for a caller associated with a call and delivering the selected enhanced Caller ID information to a callee associated with the call. The system includes electronic communications devices 102 and 104 communicatively coupled through communications network 106. Devices 102 and 104 can be smartphones, tablet computers, personal computers or laptops, desktop phones, mobile communications devices, gaming consoles, or other type of computing devices with voice and data communications capabilities. Devices 102 and 104 are also communicatively coupled to phone system 108 through communications network 106. In the presently described example embodiment, phone system 108 is a cloud-based telephony system; however, other phone systems can be contemplated by those skilled in the art. Cloud phone system 108 is configured to access local data storage 110, to access cloud data storage 112 on the Internet 114, and to access web page(s) 120 of web site(s) 116 on the Internet 114. Communications network 106 can be cellular communications network or can be the Internet. The call can represent either a voice communication or a data communication.

In some example implementations, cloud phone system 108 uses Voice over IP (VoIP) technology to deliver a hosted phone system over communications network 106. The phone system may be hosted on a private or public server computer system. Cloud phone system 108 may use Internet networking protocols to facilitate voice communications between devices 102 and 104 such as, for example, the Internet Protocol (IP) and the Session Initiation Protocol (SIP). With the facilitation of cloud phone system 108, mobile communications device 102 (or device 104) may place a phone call to mobile communications device 104 (or device 102) over communications network 106. Once the phone call has been established, voice and data may be sent over communications network 106 between the devices 102 and 104 in IP data packets.

Example Method

Figure 2:
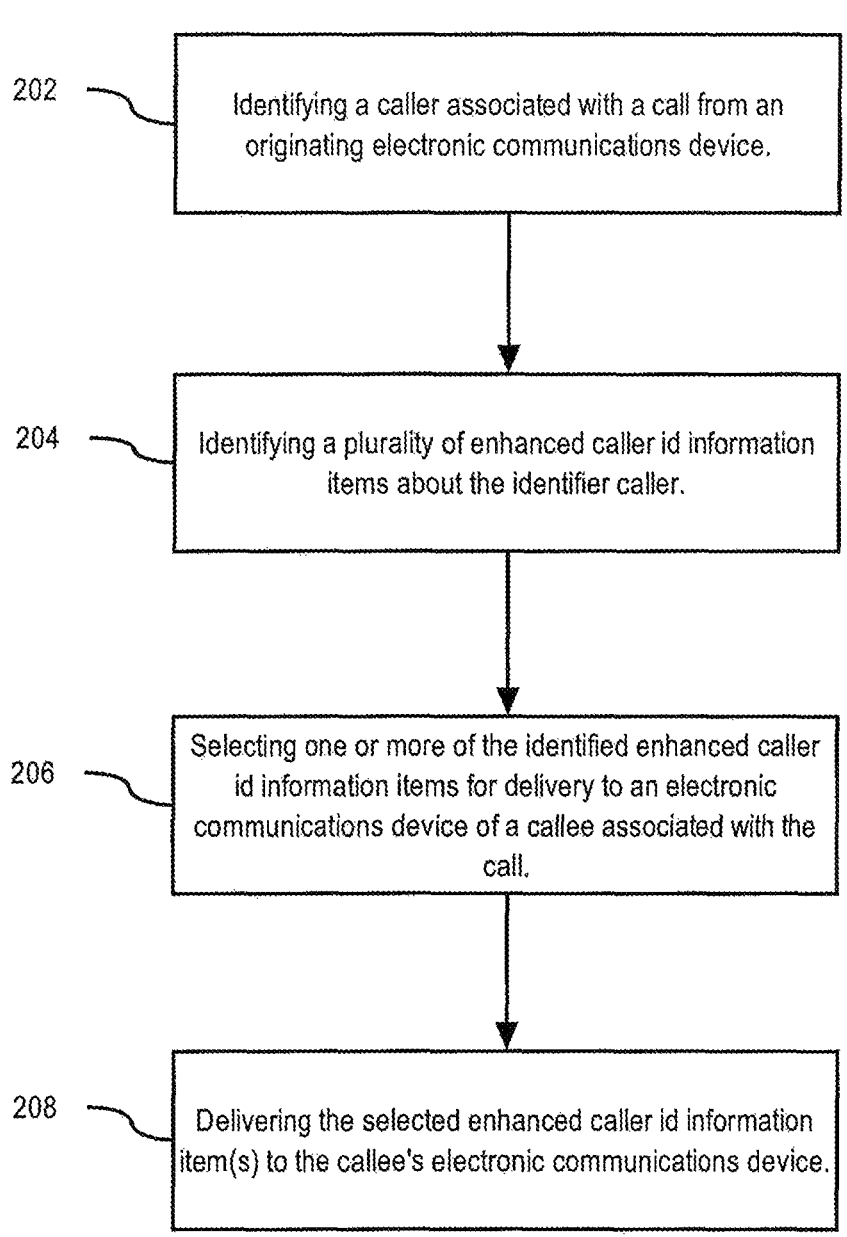
FIG. 2 is a flowchart of an example method for selecting one or more enhanced Caller ID information items for a caller associated with a call and delivering the selected enhanced Caller ID information to a callee associated with the call.

FIG. 2 is a flowchart of example method 200 for selecting one or more enhanced Caller ID information items for a caller associated with a call and delivering the selected enhanced Caller ID information to a callee associated with the call. Method 200 will now be explained with reference to the example system 100 of FIG. 1.

Method 200 can be performed by one or more processes executing on one or more servers of cloud phone system 108. Method 200 includes identifying 202 a caller associated with a call from an originating electronic communications device 102. The identification can be performed based on information included in a conventional Caller ID database hosted by the cloud phone system 108, as described in greater detail in conjunction with FIG. 3.

Method 200 further includes identifying 204 a plurality of enhanced Caller ID information items about the identified caller. In general, enhanced Caller ID information items can include any available information about the identified caller including, but not limited to, the caller's previous call history, the caller's social networking activity (e.g., the caller's posts, likes, and other activity on a social networking web site), news stories, articles, or blog posts about the caller, the caller's resume or curriculum vitae, the caller's job history, the caller's birthday, anniversary, or other personally important date, the caller's employer or affiliation, past or future events or meeting scheduled on a calendar associated with the caller, or any other information about the caller that can supplement conventional Caller ID information which typically includes just the caller's name, nickname, address, and/or photo.

In general, enhanced Caller ID information about the identified caller can be stored at multiple locations. In some implementations, enhanced Caller ID information items about the identified caller can be identified by searching a first database accessible to cloud phone system 108. For example, a local query executed by cloud phone system 108 can identify the caller's enhanced Caller ID information items stored on data storage 110 local to cloud phone system 108.

In some example implementations, enhanced Caller ID information items about the identified caller are identified by searching a second database located on a network server system. For example, a network query launched by cloud phone system 108 can identify the caller's enhanced Caller ID information items stored on data storage 112 located on a network server of an internet service provider, or a social networking site, and the like.

In some implementations, enhanced Caller ID information items about the identified caller can be identified by searching or crawling web page(s) 120 of web site(s) 116 on the Internet 114. For example, an Internet search engine query launched by cloud phone system 108 can identify the caller's enhanced Caller ID information items publicly available on web page(s) 120 served by web site(s) 116.

In some implementations, enhanced Caller ID information items about the identified caller can be identified in information received from the caller's electronic communications device 102. For example, cloud phone system 108 can identify enhanced Caller ID items in incoming call information sent from the caller's device 102.

Further, method 200 includes selecting 206 one or more of the identified enhanced Caller ID information items for delivery to electronic communications device 104 of a callee associated with the call. As described in detail below in connection with FIG. 4, selection of the one or more identified enhanced Caller ID information items to deliver can be based on selection criteria.

Finally, method 200 includes delivering 208 the selected enhanced Caller ID information item(s) to electronic communications device 104 of the callee. In some implementations, the selected enhanced Caller ID information item(s) can be delivered in one or more IP data packets to the callee's electronic communications device 104. For example, the selected enhanced Caller ID information item(s) can be delivered in one or more SIP messages, one or more HyperText Transfer Protocol (HTTP) messages, or one or more other IP-based application networking layer protocol messages.

While in the embodiment of the method 200 of FIG. 2, enhanced Caller ID items about the identified caller are selected, enhanced Caller ID items about the callee are selected in addition to or instead of selecting enhanced Caller ID items about the caller in other embodiments. In these embodiments, the selected enhanced Caller ID items about the callee can be delivered to the electronic communications device of the caller for presentation to the caller at the caller's electronic communications device. The identity of the callee can be established similar to how the identity of the caller is established except using a unique contact identifier of the callee (e.g., a dialed phone number) instead of a unique contact identifier of the caller. Thus, the techniques described herein for selecting enhanced Caller ID items about a caller and delivering them to a callee's device apply equally to selecting enhanced Caller ID items about a callee and delivering them to a caller's device.

Further, while in some example embodiments, the method 200 of FIG. 2 is performed in the two-party call paradigm, method 200 may be performed in a multi-party call (i.e., more than two participants) in other example embodiments. For example, enhanced Caller ID items about participants in the multi-party can be selected and delivered to the endpoint communications devices of other participants in the call.

Example Cloud Phone System

Figure 3:
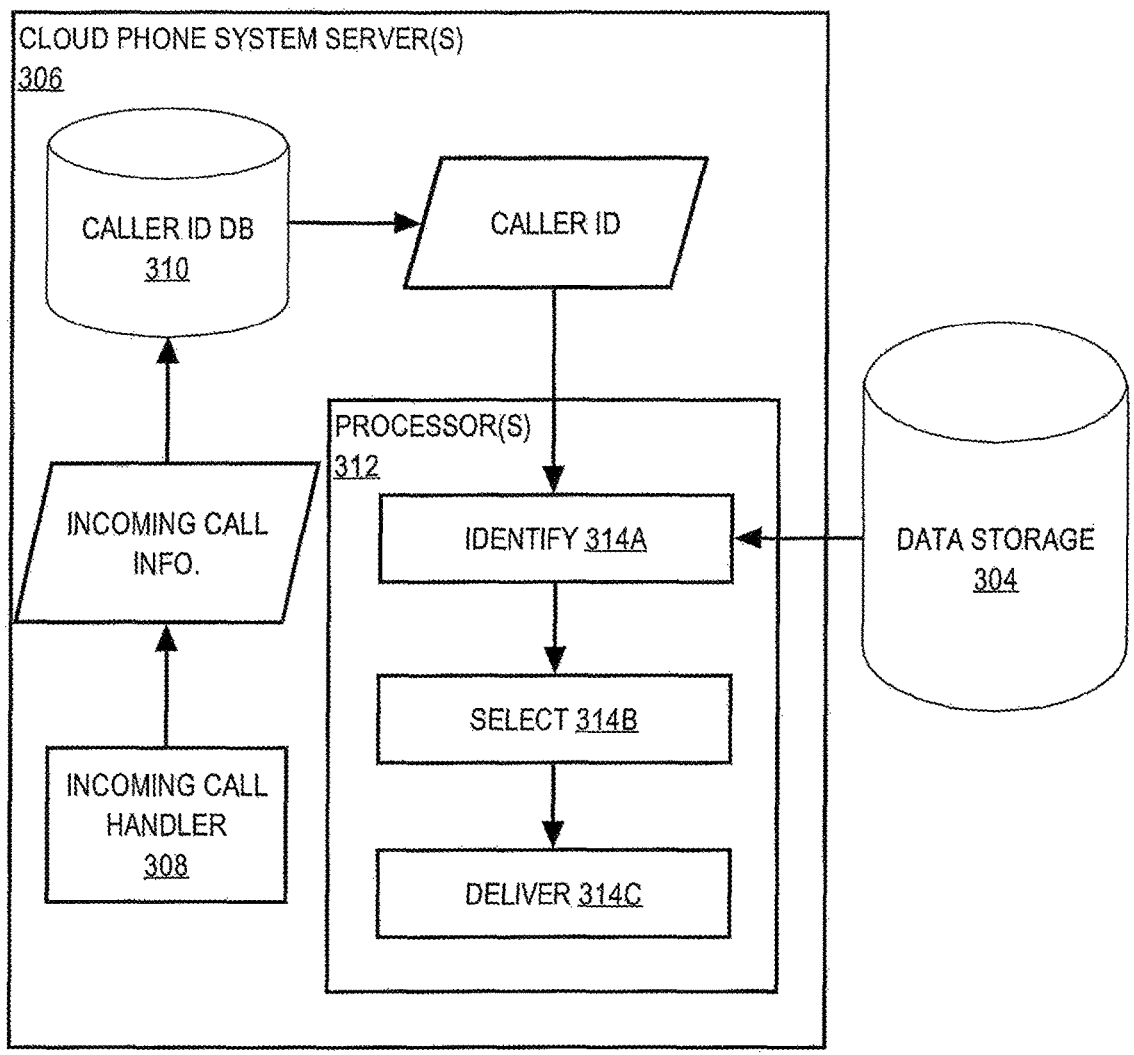
FIG. 3 is a block diagram of an example cloud phone system and associated method for selecting one or more enhanced Caller ID information items for a caller associated with a call and delivering the selected enhanced Caller ID information to a callee associated with the call.

FIG. 3 is a block diagram of an example cloud phone system 300 and associated method 302 for selecting one or more enhanced Caller ID information items for a caller associated with a call and delivering the selected enhanced Caller ID information to a callee associated with the call. System 300 includes data storage 304 configured to store collections of enhanced Caller ID information items for users of system 300. Additionally, system 300 includes cloud phone system server(s) 306 communicatively coupled with data storage 304. In some implementations, data storage 304 is included in cloud phone system server(s) 306. The cloud phone system server(s) 306 include incoming call handler 308, conventional Caller ID database 310, and processor(s) 312.

The cloud phone system server(s) 306 can receive an incoming call at incoming call handler 308. The incoming call can be a voice communication, a text communication, a video communication, a fax communication, and the like. Processor(s) 312 can compare information about the incoming call produced by incoming call handler 308 against information stored in conventional Caller ID database 310 to determine the caller's identity.

In some implementations, the incoming call information includes at a unique contact identifier of the caller. For example, the unique contact identifier can be a telephone number, an e-mail address, a user identifier, a Uniform Resource Indicator (URI).

Processor(s) 312 can match the unique contact identifier associated with the incoming call to corresponding conventional Caller ID information stored in conventional Caller ID database 310. The conventional Caller ID information can include a name, nickname, or the like, associated with the unique contact identifier.

Processor(s) 312 are configured to identify conventional Caller ID information in conventional Caller ID database 310 and a plurality of enhanced Caller ID information items pertaining to the identified caller stored in another database 304. Processor(s) 312 are further configured to select one or more of the identified enhanced Caller ID information items and deliver the selected enhanced Caller ID information items to an electronic communications device of a callee. Method 314 can be performed by processor(s) 312 to accomplish the identifying, selecting, and delivering.

Method 314 includes identifying 314A enhanced Caller ID information pertaining to the identified caller. Identifying 314A can include a determination whether data storage 304 includes enhanced Caller ID information associated with the identifier caller.

In some implementations, to determine whether data storage 304 includes enhanced Caller ID information associated with the identified caller, processor(s) 312 are configured to query data storage 304 based on the unique contact identifier.

If enhanced Caller ID information associated with identified caller is identified in data storage 304, method 314 further includes selecting 314B one or more of the identified enhanced Caller ID information items based on selection criteria, as described in detail below in connection with FIG. 4. In some implementations of selecting 314B, processor(s) 312 are further configured to rank identified enhanced Caller ID information items according to their perceived relevance to the callee and to select, the best (e.g., highest) ranking enhanced Caller ID information item(s) to deliver to the callee's electronic communications device. Accordingly, prior to selecting one or more of the identified enhanced Caller ID information items, the identified enhanced Caller ID information items may be ranked according to their perceived relevance to the callee.

Finally, processor(s) 312 are configured to deliver 314C the selected enhanced Caller ID information items to an electronic communications device of the callee. In some implementations of delivering 314C, processor(s) 312 are further configured to include the selected enhanced Caller ID information items in one or more outbound IP-based data packets sent to the callee's electronic communications device by cloud phone system server(s) 306 as part of establishing, connecting, delivering, or otherwise facilitating the call. For example, processor(s) 312 can be configured to add the selected enhanced Caller ID information items to one or more e-mail messages, one or more text messages, one or more SIP messages, one or more HTTP messages, or one or more other type of network messages sent by cloud phone system server(s) 306 to establish, connect, deliver, or otherwise facilitate the call.

In some implementations, some or all of a selected enhanced Caller ID information item may be delivered to the callee's device by reference. That is, a hyperlink, such as, for example, a Uniform Resource Locator (URL), that references a network location of the enhanced Caller ID information item, may be delivered to the callee's device instead of delivering the entire content of the enhanced Caller ID information item. The hyperlink, when activated at the callee's device, causes the callee's device to download content of the enhanced Caller ID information item from the network location referenced by the hyperlink and present the downloaded content to the callee at the callee's device. This by-reference delivery method may be preferable when content of the enhanced Caller ID information is presented to the callee at the callee's device upon the callee's request (e.g., in response to detecting the callee's input to the device), or to avoid having to store the content on cloud phone system server(s) 306, or because the content is multimedia content, or for some other reason.

Example Selection Criteria

FIG. 4 shows an example of a method 400 for selecting 402 one or more of a set of identified enhanced Caller ID information items pertaining to a caller prior to delivering the selected items to an electronic communications device of a callee.

In some implementations, selecting 402 enhanced Caller ID information items to deliver to the callee's device can include selecting 404 enhanced Caller ID information items from among the set of identified enhanced Caller ID information items pertaining to the caller that have a relevance ranking better than or equal to a pretermitted ranking threshold. For example, enhanced Caller ID information items in the set of identified enhanced Caller ID information items pertaining to the caller can be ranked according to their perceived relevance to the callee. For example, enhanced Caller ID information items may be automatically ranked better (e.g., higher) if the enhanced Caller ID information items are more recent than other enhanced Caller ID information items. Additionally, enhanced Caller ID information items can be automatically ranked better (e.g., higher) if they pertain to the callee as well as the caller. For example, call records for previous calls between the caller and the callee may be automatically ranked better (e.g., higher) than other enhanced Caller ID information pertaining to the caller that does not also pertain to the callee.

In some implementations, ranking enhanced Caller ID information items according to their perceived relevance to the callee is based on a known relationship between the caller and the callee. For example, if the caller and the callee have a patient-physician relationship, then enhanced Caller ID items pertaining to the patient's medical history with that physician may be automatically ranked better that other enhanced Caller ID information pertaining to the caller.

In some implementations, ranking enhanced Caller ID information items according to their perceived relevance to the callee is based on answers the caller provided in response to prompts from an interactive voice response (IVR) system. For example, the callee may be a business that uses an IVR system to prompt callers whether they are seeking sales support or technical support before connecting the call to a sales representative, in the case the caller is seeking sales support, or a technical support representative, in the case the caller is seeking technical support. Depending on the type of support the caller is seeking, enhanced Caller ID items pertaining to the selected type of support may be automatically ranked better than other enhanced Caller ID information pertaining to the caller. For example, if the caller is seeking sales support, then enhanced Caller ID items pertaining to the caller's purchase activity with the callee may be ranked better. On the other hand, if the caller is seeking technical support, then enhanced Caller ID items pertaining to any open service tickets with the callee may be ranked better.

Accordingly, in some implementations, selecting 402 enhanced Caller ID information items to deliver to the callee's device can include selecting 406 enhanced Caller ID information items from among the set of identified enhanced Caller ID information items pertaining to both the caller and the callee. For example, metadata associated with an identified enhanced Caller ID information item can include information relating to the parties of a call, if the identified enhanced Caller ID information item pertains to a call. If the party information indicates that both the caller and the callee were parties to the call, then the enhanced Caller ID information item may be selected. If there are multiple identified enhanced Caller ID information items pertaining to calls between the caller and the callee, then one or more of the most recent of the multiple items may be selected.

In some implementations, selecting 402 enhanced Caller ID information items to deliver to the callee's device can include selecting 408 enhanced Caller ID information items from among the set of identified enhanced Caller ID information items pertaining to the caller that have not yet been delivered to the callee, or have been delivered to the callee less than or equal to a threshold number of times. For example, metadata associated with an enhanced Caller ID information item pertaining to the caller may track whether or how many times the item has been delivered to an electronic communication device of the callee. If the item has never been so delivered or so delivered less than or equal to a threshold number of times, then the item may be selected for delivery. If there are multiple of such items pertaining to the caller, then the most or a number of recent of the multiple items may be selected.

In some implementations, selecting 402 enhanced Caller ID information items to deliver to the callee's device can include selecting 410 enhanced Caller ID information items from among the set of identified enhanced Caller ID information items pertaining to the caller that are associated with an event. The event may be a business promotion, a wedding, a birthday, an anniversary, or other event important to the caller. For example, method 400 can include selecting from among the set of identified enhanced Caller ID information items pertaining to the caller an enhanced Caller ID information item concerning a recent job promotion of the caller. By delivering this information as Caller ID information to the callee's device, the callee is informed of the caller's recent promotion in the context of answering or responding to the call where the callee might not otherwise know about the promotion in the same context.

In some implementations, selecting 402 enhanced Caller ID information items to deliver to the callee's device can include selecting 412 enhanced Caller ID information items from among the set of identified enhanced Caller ID information items pertaining to the caller relating to a geo-location of the originating electronic communications device. Referring to FIG. 3, the receiving incoming call information may include the current geo-location of the originating communication device. For example, if the incoming call is placed from a business phone (e.g., landline) the geo-location of the business phone can be extracted from business address information stored in conventional Caller ID database 310. As another example, if the incoming call is placed from a smartphone equipped with a global positioning system module, an accurate geo-location of the smart phone can be obtained as part of the received incoming call information. For example, when the incoming call information includes an indication that the call originated in Palo Alto, Calif., USA, method 400 can include selecting from among the set of identified enhanced Caller ID information items pertaining to the caller one or more enhanced Caller ID information items pertaining to Palo Alto. Alternatively, the set of identified enhanced Caller ID information items pertaining to the caller may include items pertaining to a known current geo-location of the callee's electronic communications device. In this case, when the incoming call information includes an indication that the callee's electronic communications device is currently located in Washington D.C., USA, method 400 can include selecting from among the set of identified enhanced Caller ID information items pertaining to the caller one or more enhanced Caller ID information items pertaining to Washington D.C., USA.

In some implementations, selecting 402 enhanced Caller ID information items to deliver to the callee's device can include selecting 412 enhanced Caller ID information items from among the set of identified enhanced Caller ID information items pertaining to the caller relating to environmental information detected at the caller's electronic communications device. For example, the incoming call may include information about the physical environment in which the caller's electronic communications device is situated. Such physical environment information may include, for example, an air temperature reading (e.g., by a thermometer of the device), an ambient noise level measurement (e.g., by a microphone of the device), an ambient light level measurement (e.g., by a camera or other light sensor of the device), or a bio-measurement of the caller such as, for example, the caller's heart rate or physical activity measurement. In the case where a selected enhanced Caller ID information relates to environment information detected at the caller's electronic communications device, the enhanced Caller ID information item may be provided to the cloud phone system performing the selecting from the caller's electronic communications device, for example, in conjunction with the incoming call.

For example, information about the caller's physical condition as detected by the caller's electronic communication device or sensors attached thereto could be valuable to communicate to the callee as enhanced Caller ID information items if the callee is the caller's doctor or other public emergency personnel. To protect the caller's privacy, the physical condition information about the caller may be delivered to only certain callees as reflected by access controls associated with the information. More generally, an enhanced Caller ID information item or a class or group enhanced Caller ID information items about a caller can be associated with access control permissions which reflect which callees or groups of callees have permission to receive the enhanced Caller ID information items.

In some implementations, selecting enhanced Caller ID information items to deliver to the callee's device can include selecting 414 enhanced Caller ID information items from among the set of identified enhanced Caller ID information items pertaining to the caller relating to a current time of the call. For example, the current time of the call can be used to select from among the set of identified enhanced Caller ID information items pertaining to the caller an enhanced Caller ID information item indicating an activity the caller very recently participated in. For example, if the caller recently finished (e.g., within a threshold amount of time from the current time of the time) participating in a calendared meeting or event according to the current time of the call and date/time and duration information associated with the calendared meeting or event, then an enhanced Caller ID information item indicating the meeting or event may be selected. By delivering this information as Caller ID information to the callee's device, the callee is informed of the caller's recent activities in the context of answering or responding to the call where the callee might not otherwise know about the activities in the same context. The current time of the call, from the caller's perspective, can also be valuable in the context of the caller and the callee being in different time zones. This can happen increasingly with international calling, and the callee's awareness of the time of day for the caller can help the callee to tailor their communication more effectively.

In some example implementations, selecting enhanced Caller ID information items to deliver to the callee's device can include selecting 414 enhanced Caller ID information items from among the set of identified enhanced Caller ID information items pertaining to the caller relating to the caller's emotional state. The caller's emotional state may be inferred from content of the call and/or information detected by an accelerometer sensor and/or other MEMs sensors, such as temperature or heartbeat sensors, associated with the caller's electronic communications device. Data collected from multiple sensors such as an accelerometer and one or more other MEMs sensors can be combined for improved or more accurate assessment of the caller's emotional state. For example, an audio signal analysis of the caller's voice during the call can be performed to determine if the caller may be excited or agitated or in an otherwise highly emotional state. Information from the accelerometer of the caller's device may be used to corroborate a determination resulting from the audio signal analysis. For example, information from the accelerometer indicating the caller's device is rapidly moving or changing positions may be because the caller is nervous, exited, angry, or otherwise in a highly emotional state. Geo-location data (location based services data such as GPS) can also be used or complemented with MEMs data to further assess the caller's state, such as determining the caller is in an emergency room at a hospital or at a scene of accident.

In some implementations, selecting enhanced Caller ID information items to deliver to the callee's device can include selecting 414 enhanced Caller ID information items from among the set of identified enhanced Caller ID information items pertaining to the caller relating to the caller's non-publically available information where the information is available to the callee under appropriate conditions such as, for example, when it is clear the caller would authorize sharing of certain non-public information with the callee based on the identity of the callee. For example, if a job seeker calls a number for an employment service, resume items from the caller's resume or items about the caller's employment history may be selected for delivery to the callee's device.

As another example, the caller may not be proficient or fluent in the speaking language of the callee. Thus, an enhanced Caller ID item that indicates the primary speaking language of the caller, or indicates that the primary speaking language of the caller is not that of the callee, could be selected for delivery to the callee's device when the primary speaking language of the caller does not match the primary speaking language of the callee. Such primary speaking language preferences could be maintained as part of user profiles or user accounts, for example.

Example Delivery Method

FIG. 5 shows an example of a method 500 for delivering 502 the one or more selected enhanced Caller ID information items to the endpoint electronic communications device of the callee.

In some implementations, the delivering 502 can include sending 504 the selected enhanced Caller ID information items in one or more IP-based data packets toward the callee's electronic communications device. For example, the selected enhanced Caller ID information items can be sent in one or more SIP data packets of which at least one of the SIP data packets is for ringing the callee's electronic communications device about the incoming call. The selected enhanced Caller ID-information items are not limited to being sent in SIP data packets and the selected enhanced Caller ID information items can be sent in one or more other types of application layer networking data packets such as, for example, in one or more HTTP packets, one or more eXtensible Messaging and Presence Protocol (XMPP) packets, one or more Real-time Transport Protocol (RTP) packets, one or more Real Time Streaming Protocol (RTSP) packets, and so forth.

The IP-based data packets containing the selected enhanced Caller ID information items received at the callee's electronic communications device can be received at the callee's electronic communications device at different times relative to the call. For example, the selected enhanced Caller ID information items can be received and presented at the callee's electronic communications device when the call is incoming to the device. In this case, the selected enhanced Caller ID information items can be presented to the callee at the device when ringing the callee about the call. For example, the device may produce an audible phone ringing sound from a speaker of the callee's device and at the same time display on a display device of the callee's device "Incoming call from John Doe. John was recently promoted to Vice President at ACME Corp.", where the information about John's promotion is selected enhanced Caller ID information.

In addition or alternatively, selected enhanced Caller ID information items can be received and presented at the callee's electronic communications device during the call. For example, the cloud phone system may monitor the voice communications of the call including performing a real-time speech-to-text translation of the voice communications. A selected enhanced Caller ID information item may be sent to the callee's device in response to detecting a spoken keyboard. The selected Caller ID information item sent to the callee's device may pertain to the spoken keyboard. For example, if during the call one of the parties to the call mentions "wife", an enhanced Caller ID item identifying the name of the caller's wife may be sent to the callee's device. The device may display the caller's wife's name to the callee in response to receiving the selected enhanced Caller ID information item. In this way, the callee would know the name of the caller's wife without having to ask the caller, which might be embarrassing to the callee if the callee is expected to know the caller's wife's name.

In some embodiments, a selected enhanced Caller ID item about the caller is not delivered to the callee until after receiving permission from the caller to share the enhanced Caller ID item with the callee. For example, after selecting an enhanced Caller ID item about the caller but before delivering the item to the callee's electronic communications device, the cloud phone system may send the item to the caller's device so as to prompt the caller to confirm sharing of the item with the callee. If the caller declines, then the item is not delivered to the callee's device. If the caller approves, then the item is delivered to the callee's device.

Implementing Computing Device

The systems, methods, and apparatuses of the present invention may be implemented on one or more computing devices. Such a computing device may be implemented in various forms including, but not limited to, a client, a server, a network device, a mobile device, a laptop computer, a desktop computer, a workstation computer, a personal digital assistant, a blade server, a mainframe computer, and other types of computers. The computing device described below and its components, including their connections, relationships, and functions, is meant to be exemplary only, and not meant to limit implementations of the systems, methods, and apparatuses described in this specification. Other computing devices suitable for implementing the systems, methods, and apparatuses of the present invention may have different components, including components with different connections, relationships, and functions.

Figure 6:
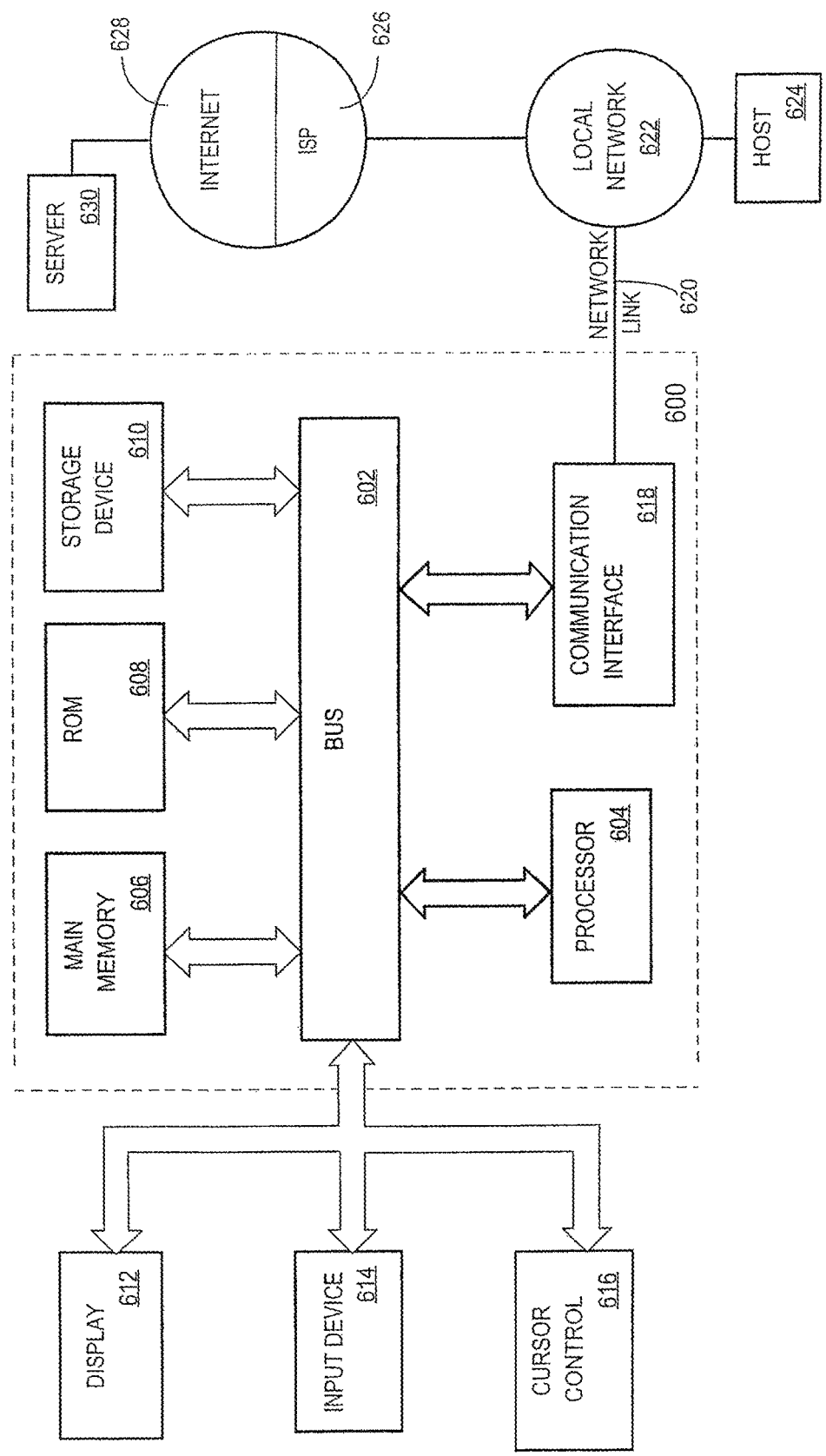
FIG. 6 is a block diagram of an example computing device with which the systems, methods, and apparatuses of the present invention may be implemented.

FIG. 6 is a block diagram that illustrates an example of a computing device 600 suitable for implementing the systems, methods, and apparatuses of the present invention. Computing device 600 includes a bus 602 or other communication mechanism for communicating information, and a hardware processor 604 coupled with bus 602 for processing information. Hardware processor 604 may be, for example, a general purpose microprocessor or a system on a chip (SoC).

Computing device 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computing device 600 into a special-purpose computing device that is customized to perform the operations specified in the instructions.

Computing device 600 further includes a read only memory (ROM) 608 or other static storage device coupled to bus 602 for storing static information and instructions for processor 604.

A storage device 610, such as a magnetic disk, optical disk, or solid-state drive is provided and coupled to bus 602 for storing information and instructions.

Computing device 600 may be coupled via bus 602 to a display 612, such as a liquid crystal display (LCD) or other electronic visual display, for displaying information to a computer user. Display 612 may also be a touch-sensitive display for communicating touch gesture (e.g., finger or stylus) input to processor 604.

An input device 614, including alphanumeric and other keys, is coupled to bus 602 for communicating information and command selections to processor 604.

Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computing device 600 may implement the methods described herein using customized hard-wired logic, one or more application-specific integrated circuits (ASICs), one or more field-programmable gate arrays (FPGAs), firmware, or program logic which, in combination with the computing device, causes or programs computing device 600 to be a special-purpose machine.

The methods herein may also be performed by computing device 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a computing device to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip of cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or fight waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone fine using a modem. A modem local to computing device 600 can receive the data on the telephone fine and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computing device 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computing device 600, are example forms of transmission media.

Computing device 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

A software system is typically provided for controlling the operation of computing device 600. The software system, which is usually stored in main memory 606 and on fixed storage (e.g., hard disk) 610, includes a kernel or operating system (OS) which manages low-level aspects of computer operation, including managing execution of processes, memory allocation, file and network input and output (I/O), and device I/O. The OS can be provided by a conventional operating system such as, for example, MICROSOFT WINDOWS, SUN SOLARIS, LINUX, UNIX, IOS, ANDROID, and so forth.

One or more application(s), such as client software or "programs" or set of processor-executable instructions, may also be provided for execution by computer 600. The application(s) may be "loaded" into main memory 606 from storage 610 or may be downloaded from a network location (e.g., an Internet web server). A graphical user interface (GUI) is typically provided for receiving user commands and data in a graphical (e.g., "point-and-click" or "touch gesture") fashion. These inputs, in turn, may be acted upon by the computing device in accordance with instructions from OS and/or application(s). The graphical user interface also serves to display the results of operation from the OS and application(s).

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A telephony system, comprising:
a memory device that stores a set of instructions; and
at least one processor connected to said memory device and configured to execute the set of instructions for:
receiving call information about an incoming call;
receiving a request from a callee to obtain publicly available information about the caller;
determining an identity of a caller originating the incoming call;
based on the request and the identity of the caller, enabling a launch-of an Internet search query to obtain the publicly available information about the identified caller;
prompting the caller to confirm sharing the obtained information with a callee; and
delivering the obtained information to the callee, wherein the enhanced Caller ID information is selected from the publicly available information.

2. The system of claim 1, wherein enabling the launch of the Internet search query includes accessing a predetermined web site.

3. The system of claim 1, wherein enabling the launch of the Internet search query includes communicating with a server of an internet service provider.

4. The system of claim 1, wherein enabling the launch of the Internet search query includes searching or crawling a plurality of web pages.

5. The system of claim 2, wherein the predetermined web site is a social networking web site and the publicly available information includes the identified caller's social networking activity.

6. The system of claim 1, wherein the enhanced Caller ID information includes a plurality of items, wherein each item has a relevance ranking.

7. The system of claim 6, wherein the at least one processor is further configured to select at least one of the plurality of items based, at least in part, on a comparison between the relevance ranking of each item and a predetermined ranking threshold and deliver the at least one selected item to the callee.

8. The system of claim 1, wherein the at least one processor is further configured to monitor voice communications of the call by performing a real-time speech-to-text translation of the voice communications, and to launch the Internet search query in response to detecting a spoken keyword in the call.

9. The system of claim 1, wherein the at least one processor is further configured to receive permission from the caller to deliver the enhanced Caller ID information.

10. The system of claim 1, wherein the at least one processor is further configured to deliver the enhanced Caller ID information using one or more IP data packets.

11. The system of claim 1, wherein the at least one processor is further configured to deliver the enhanced Caller ID information using a hyperlink.

12. The system of claim 1, wherein the at least one processor is further configured to download content from a network location referenced by a hyperlink.

13. A computing device, comprising:
- a memory device that stores a set of instructions; and
- at least one processor connected to said memory device and configured to execute the set of instructions for:
  - receiving call information about an incoming call;
  - determining an identity of a caller originating the incoming call;
  - delivering information about the identified caller;
  - based on the identity of the caller, enabling a launch of an Internet search query to obtain publicly available information about the identified caller; and
  - sending the obtained information to the caller to prompt the caller to confirm sharing the obtained information with a callee; and
  - upon receiving a permission from the caller, delivering the obtained information to the callee.

14. The computing device of claim 13, wherein enabling the launch of the Internet search query includes accessing a predetermined web site.

15. The computing device of claim 14, wherein enabling the launch of the Internet search query includes identifying information about the caller in the predetermined web site.

16. The computing device of claim 13, wherein enabling the launch of the Internet search query includes downloading content from a network location referenced by a hyperlink.

17. The computing device of claim 13, wherein the at least one processor is further configured to monitor voice communications of the call by performing a real-time speech-to-text translation of the voice communications, and to launch the Internet search query in response to detecting a spoken keyboard in the call.

* * * * *